(12) United States Patent
Gupta et al.

(10) Patent No.: US 10,897,488 B1
(45) Date of Patent: Jan. 19, 2021

(54) MULTIPLEXING TRAFFIC FROM MULTIPLE NETWORK NAMESPACES TO A SINGLE LISTENER IN A STREAM-BASED SERVER APPLICATION

(71) Applicant: EMC Corporation, Hopkinton, MA (US)

(72) Inventors: Mukesh Gupta, Shrewsbury, MA (US); Robert Evan Frazier, Fuquay-Varina, NC (US); Pascal Donette, Hopkinton, MA (US); Arthur Otis Harris, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 470 days.

(21) Appl. No.: 14/985,749

(22) Filed: Dec. 31, 2015

(51) Int. Cl.
*G06F 15/16* (2006.01)
*H04L 29/06* (2006.01)

(52) U.S. Cl.
CPC ........ *H04L 65/4069* (2013.01); *H04L 65/607* (2013.01); *H04L 67/42* (2013.01)

(58) Field of Classification Search
CPC ... H04L 65/4069; H04L 65/607; H04L 67/42; H04L 12/4633; H04L 12/4641; H04L 45/04; H04L 41/147; H04L 41/0896; H04L 41/16; H04L 43/067; H04L 43/0876; H04L 43/16
USPC ......................................................... 709/224
See application file for complete search history.

(56) References Cited

U.S. PATENT DOCUMENTS

| | | | | |
|---|---|---|---|---|
| 5,513,328 | A | * 4/1996 | Christofferson | G06F 9/544 709/244 |
| 5,519,833 | A | * 5/1996 | Agranat | G06F 9/544 709/219 |
| 5,909,589 | A | * 6/1999 | Parker | G09B 5/065 712/32 |
| 5,987,518 | A | * 11/1999 | Gotwald | H04N 21/4381 709/230 |
| 6,067,576 | A | * 5/2000 | Berranger | G06F 9/545 719/321 |

(Continued)

OTHER PUBLICATIONS

Streams Programming Guide, Sun Microsystems, Inc., Jan. 2005 (Year: 2005).*

*Primary Examiner* — Anthony Mejia
(74) *Attorney, Agent, or Firm* — BainwoodHuang

(57) ABSTRACT

Techniques of operating a server computer running an application for clients operating in multiple network namespaces involve multiplexing communications streams from clients hosted in different network namespaces into a single communication stream to present the requests to an application as if they originated from a single network namespace. Along these lines, a server computer commences operation by initiating a network namespace driver for each network namespaces and a multiplexing driver to multiplex network namespace communication streams received from the network namespace drivers. When the multiplexing driver receives an application access request from a network namespace driver within a network namespace communication stream, the multiplexing driver provides the request and a network namespace identifier identifying the network namespace driver to a stream head within a multiplexed communication stream that includes requests from other network namespace drivers.

24 Claims, 4 Drawing Sheets

(56) References Cited

U.S. PATENT DOCUMENTS

| | | | |
|---|---|---|---|
| 7,782,869 B1* | 8/2010 | Chitlur Srinivasa | ........................ G06F 9/5011 370/230 |
| 7,813,274 B1* | 10/2010 | Venable, Sr. | ..... H04L 29/12367 370/230 |
| 7,949,785 B2 | 5/2011 | Alkhatib et al. | |
| 8,707,417 B1* | 4/2014 | Liang | ...................... G06F 21/56 726/11 |
| 8,867,349 B2 | 10/2014 | Martini et al. | |
| 8,874,749 B1 | 10/2014 | Vittal et al. | |
| 8,910,273 B1 | 12/2014 | Fausak et al. | |
| 9,014,191 B1* | 4/2015 | Mandal | ............... H04L 12/4633 370/392 |
| 9,197,543 B2 | 11/2015 | Brendel et al. | |
| 9,258,271 B1 | 2/2016 | Anderson | |
| 9,311,133 B1 | 4/2016 | Nataraja et al. | |
| 9,313,044 B2 | 4/2016 | Tsai et al. | |
| 2012/0017029 A1* | 1/2012 | Santos | .................. G06F 12/109 711/6 |
| 2014/0172944 A1* | 6/2014 | Newton | .................. H04L 41/50 709/202 |
| 2015/0207844 A1* | 7/2015 | Tataroiu | ............... H04N 21/278 709/219 |
| 2015/0381567 A1* | 12/2015 | Johnson | ................ G06F 21/105 726/12 |
| 2016/0105393 A1* | 4/2016 | Thakkar | .................. H04L 67/10 709/220 |

* cited by examiner

MULTIPLEXING TRAFFIC FROM MULTIPLE NETWORK NAMESPACES TO A SINGLE LISTENER IN A STREAM-BASED SERVER APPLICATION

BACKGROUND

Some multi-tenant application servers host IP addresses/ports in a multiple-network-namespace environment. A network namespace has its own independent set of network addresses/ports that may overlap or even be identical to another namespace's set of network addresses/ports. The server may then identify a request to access application data with a particular tenant by network identifiers such as virtual local area network (VLAN) identifiers attached to the request. To effect communication of application data to and from the clients, the applications deployed on application servers may be stream-based.

SUMMARY

Unfortunately, there are deficiencies with the above-described conventional approach to operating a server computer running an application for clients operating in multiple network namespaces. For example, some applications deployed on application servers are not network-namespace-aware. Such a lack of awareness can require significant changes to the many network service applications used to communicate with the clients. For example, when communicating with clients over TCP, an application requires a listener per network namespace to accept TCP connections from multiple network namespaces. Similarly, when communicating with clients over UDP, an application requires a stream per network namespace to exchange datagrams with clients from multiple network namespaces.

In contrast with the above-described conventional approach, improved techniques of operating a server computer running an application for clients operating in multiple network namespaces involve multiplexing communications streams from clients hosted in different network namespaces into a single communication stream to present the requests to an application as if they originated from a single network namespace. Along these lines, a server computer commences operation by instantiating a network namespace driver for each network namespace underneath a multiplexing driver to multiplex network namespace communication received from, and to demultiplex network namespace communication transmitted to, the network namespace drivers. When the multiplexing driver receives an application access request from a network namespace driver, the multiplexing driver provides the request and a network namespace identifier identifying the network namespace driver to a stream head within a multiplexed communication stream that includes requests from other network namespace drivers. After the stream head presents the request to the application, the multiplexing driver receives a reply to the request from the stream head along with the network namespace identifier. Based on the network namespace identifier, the multiplexing driver sends the reply to the appropriate network namespace driver.

Advantageously, the improved techniques arrange network communications in a multiple-network-namespace environment such that only one listener is needed even when running applications that do not recognize the multiple network namespaces. No expensive or burdensome changes to the applications running on the server computer are required to achieve such communications with clients operating in multiple network namespaces.

One embodiment of the improved techniques is directed to a method of operating a server computer running an application for clients operating in multiple network namespaces. The method includes instantiating, by processing circuitry of the server computer, (i) network namespace drivers configured to send and receive network namespace communication streams between clients operating in respective network namespaces and the application and (ii) a multiplexing driver configured to multiplex the network namespace communication streams received from the network namespace drivers for presentation to the application. The method also includes receiving, by the multiplex driver, a request from a network namespace driver within a network namespace communication stream. The method further includes providing, by the multiplexing driver, the request and a network namespace identifier identifying the network namespace driver to a stream head within a multiplexed communication stream that includes requests from other network namespace drivers, the stream head presenting the requests to the application. The method further includes receiving, by the multiplexing driver over another multiplexed communication stream, a reply to the request along with the network namespace identifier from the stream head. The method further includes, in response to receiving the reply, selecting, by the multiplexing driver, one of the network namespace drivers based on the network namespace identifier. The method further includes transmitting, by the multiplexing driver, the reply to the selected network namespace driver to satisfy the request.

Additionally, some embodiments are directed to an electronic apparatus constructed and arranged to operate a server computer running an application for clients operating in multiple network namespaces. The electronic apparatus includes memory and controlling circuitry coupled to the memory. The controlling circuitry is constructed and arranged to carry out the method of operating a server computer running an application for clients operating in multiple network namespaces.

Further, some embodiments are directed to a computer program product having a non-transitory, computer-readable storage medium that stores executable code, which, when executed by a computer, causes the computer to operate a server computer running an application for clients operating in multiple network namespaces.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of operating a server computer running an application for clients operating in multiple network namespaces involve multiplexing communications streams from clients hosted in different network namespaces into a single communication stream to present the requests to an application as if they originated from a single network namespace. Advantageously, the improved techniques arrange network communications in a multiple-network-namespace environment such that only one listener is needed even when running applications that do not recognize the multiple network namespaces.

Figure 1:
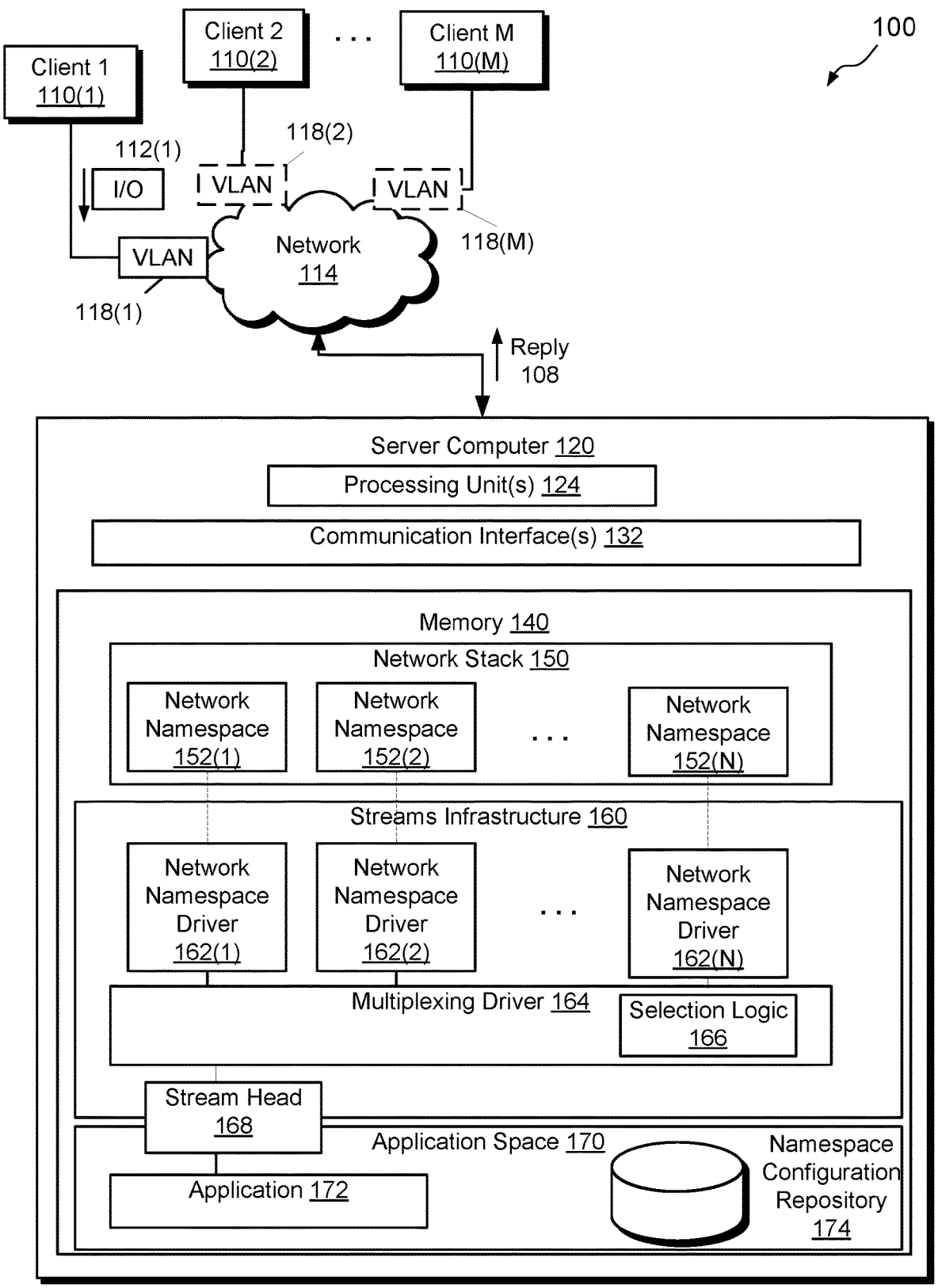
FIG. 1 is a block diagram illustrating an example electronic environment in which the improved technique can be carried out.

FIG. 1 shows an example electronic environment 100 in which embodiments of the improved techniques hereof can be practiced. Here, a client computing device ("client") 110(1) accesses a server computer 120 over a network 114. For example, the client computing device 110(1) may be a host accessing file data within an NFS environment running on a storage processor in a data storage system.

The network 114 can be any type of network or combination of networks, such as a storage area network (SAN), local area network (LAN), wide area network (WAN), the Internet, and/or some other type of network, for example. In an example, the client 110 can connect to the server computer 120 using various technologies, such as Fibre Channel (e.g., through a SAN), iSCSI, NFS, SMB 3.0, and CIFS. Any number of clients 110 may be provided, using any of the above protocols, some subset thereof, or other protocols besides those shown. The server computer 120 is configured to receive request 112(1) and to respond to such a request 112(1) and sending a reply 108, e.g., an acknowledgement.

The server computer 120 is seen to include a set of processing units 124, memory 140, and communication interfaces 132. The set of processing units 124 includes one or more processing chips and/or assemblies. In a particular example, the set of processing units 124 includes numerous multi-core CPUs. The memory 140 includes both volatile memory (e.g., RAM), and non-volatile memory, such as one or more ROMs, disk drives, solid state drives, and the like. The communication interfaces 132 include, for example, SCSI target adapters and network interface adapters, for converting electronic and/or optical signals received from the network 114 to electronic form for use by the server computer 120.

The communication interfaces 132 include separate interfaces for each network namespace 152. Specifically, there is an interface for each virtual LAN ("VLAN") 118 identified by communications from each client 110 through the network 114 and paired to a network namespace 152. For example, each client may be connected to the network 114 via a switch that defined a VLAN. Such a switch provides a VLAN identifier that identifies the switch and hence the VLAN 118 through which communications from a client 110 entered the network. In some arrangements, some clients may be on the same VLAN although such a case is not shown in FIG. 1. Further, some VLANs 118 may be identified with the same network namespace 152.

Each VLAN interface 118 in turn may correspond to a respective tenant that hosts different clients. Along these lines, each VLAN interface 118 is associated with a value of a VLAN identifier. For example, when the operating system is Linux, VLAN identifiers may take values such as "12", "34", and so on. The values of the VLAN identifiers may thus be used to direct communications between a client 110 and a network namespace 152. In some arrangements, the VLAN identifiers conform to the IEEE 802.1q standard, in which VLAN identifiers may take values between 0 and 4096.

The set of processing units 124 and the memory 140 together form control circuitry, which is constructed and arranged to carry out various methods and functions as described herein. Also, the memory 140 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 140 typically includes many other software constructs, which are not shown, such as an operating system, various applications, processes, and daemons, for example.

The memory 140 is seen to include (i.e., realize by operation of programming code) a network stack 150, a streams infrastructure 160, and one or more network application servers 170. The network stack 150 defines the various network namespaces 152(1), 152(2), . . . , 152(N) that have been allotted to the clients 110(1), . . . , 110(M). The Streams infrastructure 160 facilitates the exchange of network I/O between the network stack and the application server(s) and contains the logic for the setup and configuration of the various network namespace drivers 162(1), . . . , 162(N) and the multiplexing driver 164. The network application servers 170 implement the network protocols to support the particular network application 172.

Each of the network namespaces, e.g., network namespace 152(1), defines its own routing table. Accordingly, network namespace 152(1) may provide a tenant that serves a client, e.g., client 110(1), with its own range of network addresses/ports, while network namespace 152(2) may provide another tenant serving another client, e.g., client 110(2), with its own range of network addresses/ports. The ranges of network addresses/ports provided by network namespaces 152(1), 152(2), . . . , 152(N) may have overlapping network addresses.

Each network namespace, e.g., network namespace 152(1), may be associated with a number of VLANs 118. Some of the network namespaces, e.g., network namespace 152(1) has a single VLAN interface 118(1). However, other network namespaces may have two or more VLAN interfaces. A network namespace having multiple VLAN interfaces has its network address range distributed among multiple tenants.

The establishment of a network namespace 152, e.g., network namespace 152(1) causes the initialization of a corresponding network namespace driver 162(1) within the streams infrastructure 160. Each network namespace driver 162 adheres to a framework as defined in AT&T® System V Streams and provides functionality to manage communication streams between clients operating in respective network namespaces 152 and the application space 170. For example, network namespace driver 162(1) directs communications identified by a particular VLAN 118 to that VLAN.

The multiplexing driver 164 is a Streams module. It also adheres to Stream framework as defined in AT&T® Unix System V and provides multiplexing logic that enables communications from the various clients 110 operating in different network namespaces 152 to be presented to the non-network-namespace-aware application 172 via a single listener at the stream head 168. The multiplexing driver 164 includes a selection logic module 166.

The selection logic module 166 provides the multiplexing driver 164 with demultiplexing logic for replies that arrive from the stream head 166 for transmission back to the clients 110. The selection logic module 166 directs replies, e.g., reply 108, to a network namespace driver 162. For example, when the server computer 120 operates using a TCP protocol, the selection logic module 166 uses a network namespace identifier associated with the connection. When the server computer 120 operates using a UDP protocol, the selection logic module 166 uses a network namespace identifier associated with the session and exchanges this identifier with the stream head and application with each protocol data unit to determine how to direct communications from the multiplexing driver 164.

Figure 2:
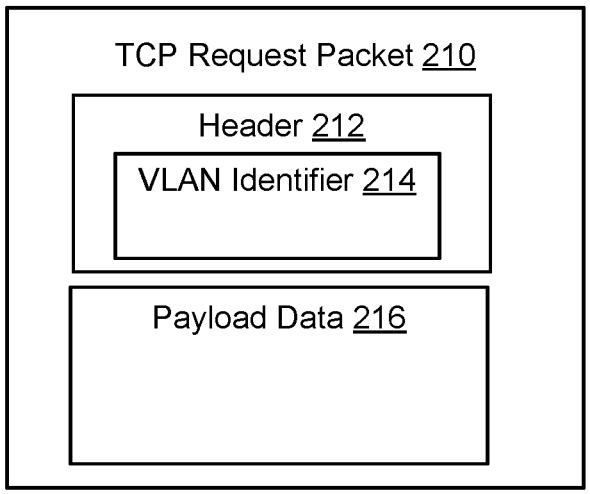
FIG. 2 is a block diagram illustrating example connection request and reply in the electronic environment of FIG. 1.
Figure 2:
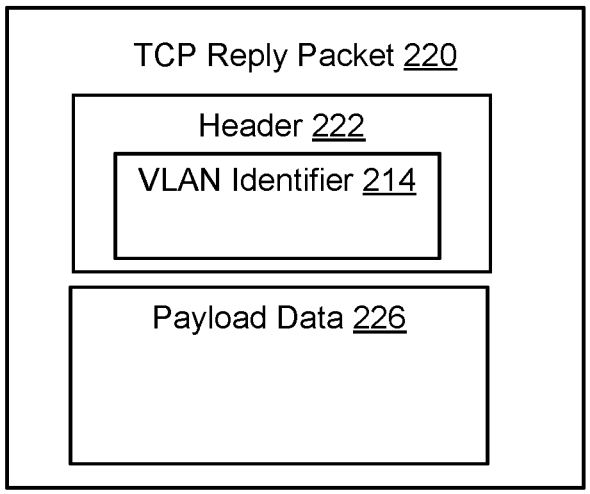

FIG. 2 shows an example TCP request packet 210 and an example TCP reply packet 220. Each packet 210 and 220 has a respective header 212 and 222 and payload 216 and 226. In each header 212 and 222, there is a VLAN identifier 214 and 224 identifying the VLAN 118 through which that packet entered or exited the network 114. For example, when a client 110 is connected to the network 114 via a switch that defines a VLAN 118, the switch adds the VLAN identifier 214 to a request packet 210 as the request packet 210 enters the network 114. The VLAN identifier 214 becomes the VLAN identifier 224 of the reply packet 220 upon generation of the reply packet at the application 172.

Returning to FIG. 1, the application 172 is unaware of the existence of multiple network namespaces 152(1), . . . , 152(N). For example, when the server computer 120 is a storage processor of a data storage system, the application 172 may be a server-hosted network file system (NFS). In this case, the requests 112 may be read requests to access data stored in a storage device and the replies 108 would carry the data read from the storage device.

The namespace configuration repository 174 is an area within the memory 140 in which various protocol-specific settings for the application 172 are stored. Upon the initialization of the network namespace drivers 162, the server computer 120 provides these settings to the network namespace drivers 162. For example, when the protocol is TCP, the settings may include TCP options such as KEEPALIVE and LINGER, among others.

As shown in FIG. 1, a Stream head 168 provides an interface between the Streams infrastructure 160 and the network application 170. The Stream head 168 is instantiated for a single stream/connection to act as a single listener for communications from the various network namespace drivers 162. As the Stream head 168 receives those communications from the multiplexing driver 164, the Stream head 168 presents those communications to the application 172 for processing. The Stream head 168 then directs replies from the application 172 back to the multiplexing driver 168.

During example network service initialization, the server computer 120 instantiates the network namespace drivers 162 and the multiplexing driver 164. For example, the server computer 120 may have added a new network namespace 152 and has gone through a reboot. During such an initialization, the server computer 120 provides the network namespace drivers 120 with the protocol-specific settings from the namespace configuration repository 174.

After the initialization, a client, e.g., client 110(1) sends a request in the form of connection request 210 to the server computer 120 for accessing the application 172. For example, the client 110(1) is a host that wishes to access file data via NFS that is run by a storage processor. A switch routes the request packet 210 and appends a VLAN identifier 214 to the header 212 of the packet 210. The switch then sends the request packet 210 to the server computer 120 at a communication interface 132 based on the routing table in the switch. The communication interface 132 directs the packet 210 to the appropriate network namespace driver, e.g., 162(1).

Figure 3:
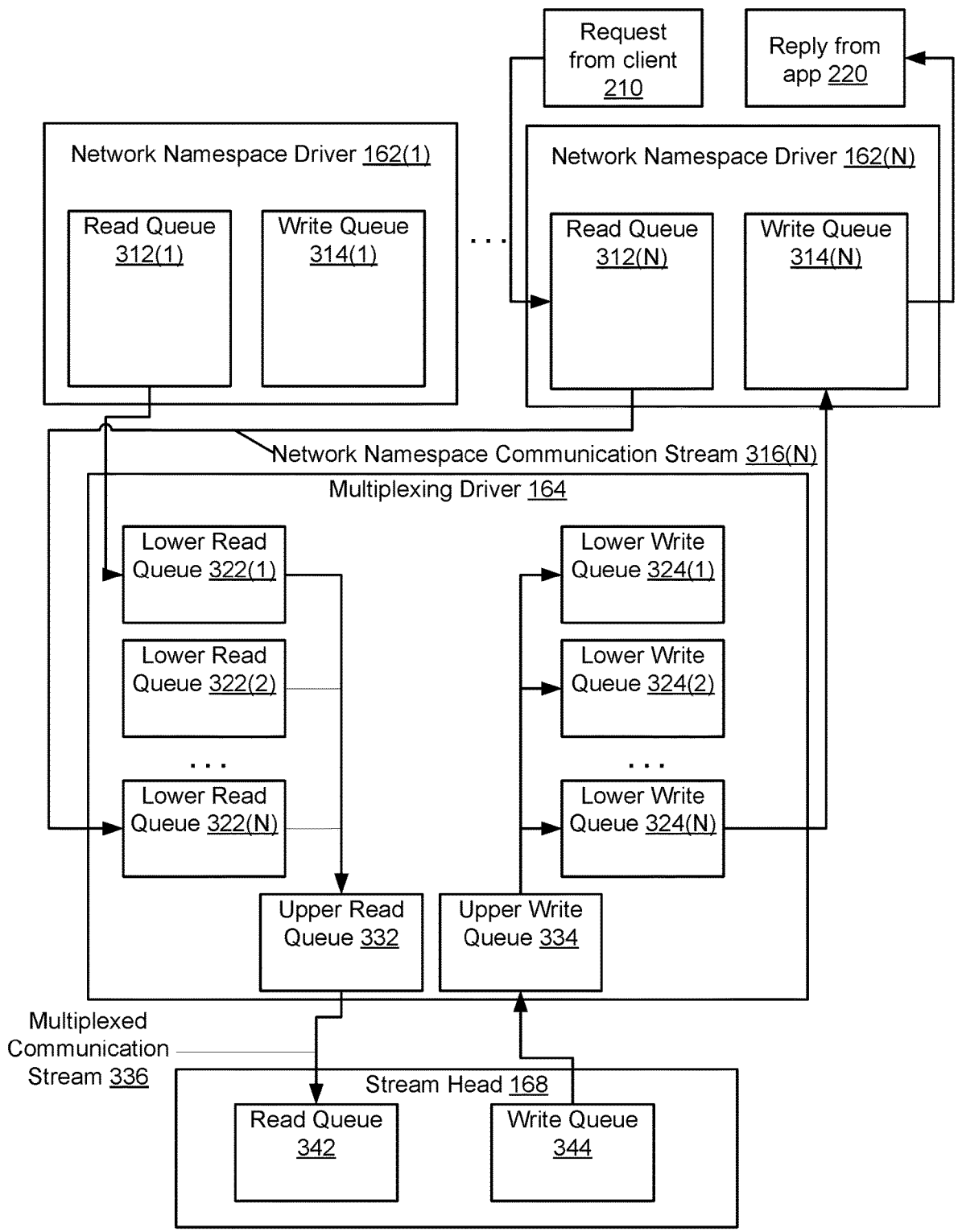
FIG. 3 is a flow chart illustrating example read and write queues in the electronic environment of FIG. 1.

As the request 210 arrives at the network namespace driver 162(1), the network namespace driver 162(1) directs the request 210 to a network namespace communication stream 316 (see FIG. 3). The network namespace driver 162(1) directs the network namespace communication stream 316 to the multiplexing driver 164.

It should be understood that the network namespace driver 162(1) arranges datagrams/requests in the stream 316 in a specified order. In most cases, the network namespace driver 162(1) arranges datagrams/requests in the stream 316 in a first-in first-out (FIFO) manner. However, other arrangements are possible, e.g., round-robin among various VLANs operating within the network namespace 152(1).

The multiplexing driver 164 multiplexes the communication streams, e.g., stream 316, from each network namespace driver 162(1), . . . , 162(N) into a single, multiplexed communication stream 336 (see FIG. 3) of datagrams (UDP) or connection requests (TCP). The multiplexing driver 164 associates Network Namespace Identifier with request received from a Network Namespace Driver 162 to identify its origin. The multiplexing driver 164 then presents this multiplexed communication stream 330 to the Stream head 168.

The Stream head 168 presents datagrams (UDP) or requests (TCP) 210 to the application 172 for processing. It should be understood that the Stream head 168 presents itself as a single network endpoint for a multiplexed stream of datagrams/requests from multiple namespaces. Each request presented by the Stream head 168 to the application 172 carries a network namespace identifier that the application can utilize for directing replies (UDP) or for other tracking/setup purposes.

The Stream head 168 places the connection request (TCP) or datagram reply (UDP) 220 into the single stream of responses directed back to the multiplexing driver 164. Each reply carries the matching namespace identifier from the associated request for directing the response through the multiplexing driver 164.

The selection logic 166 of the multiplexing driver 164 reads each reply in this other stream to determine to which network namespace driver 162 that reply is to be directed. Further details of this logic, as well as that of the multiplexing driver 164 and the Stream head 168, are described with reference to FIG. 3.

FIG. 3 shows a detailed view of the network namespace drivers 162(1), . . . , 162(N), the multiplexing driver 164, and the Stream head 168. Each of the network namespace drivers 162(1), . . . , 162(N), the multiplexing driver 164, and the Stream head 168 contain read and write queues through which the datagrams/requests are multiplexed and demultiplexed according to the logic contained therein, e,g., separation logic 166.

Each network namespace driver, e.g., network namespace driver 162(1) contains a read queue 312(1) and a write queue 314(1). As the network namespace driver 162(1) receives datagrams/requests from various clients operating in the network namespace 152(1), the network namespace driver 162(1) places those datagrams/requests in the read queue 312(1) in a FIFO manner. The network namespace driver 162(1) sends the datagrams/requests from the read queue 312(1) to the multiplexing driver via the communication stream 316(1).

The multiplexing driver 164 has a set of lower read queues 322(1), . . . 322(N) and an upper read queue 332. For example, the network namespace driver 162(1) transfers the datagrams/requests from its read queue 312(1) to the lower read queue 322(1) via the communication stream 316(1).

The other network namespace drivers 162(2), . . . , 162(N) do likewise. The multiplexing driver then transfers the datagrams/requests from each lower read queue 322 into the single-stream multiplexed upper read queue 332 according to FIFO (or round-robin) order.

The Stream head 168 has a read queue 342 into which it receives datagrams/requests. The Stream head 168 presents these datagrams/requests to the application 172 for processing.

The Stream head 168 further includes a write queue 344 into which the application 172 places replies as it processes the requests. As the application 172 places the replies into the write queue 344, Network Namespace Identifier is associated with each request (TCP) or is carried in the datagram reply (UDP). The Stream head 168 then sends each request/datagram from the write queue 344 to the multiplexing driver 164.

The multiplexing driver 164 further includes an upper write queue 334 and a set of lower write queues 324(1), . . . , 324(N), one for each network namespace driver 162(1). Upon receipt of the reply from the Stream head 168, the multiplexing driver 164 places the replies into the upper write queue 334 in the order in which they were received. Once the replies arrive in the upper write queue 334, the selection logic 166 uses the network namespace identifier to transfer the reply from the upper write queue to one of the lower write queues, e.g., lower write queue 324(1), identified with the network namespace driver 162(1).

The multiplexing driver 164 then transfers the replies in the lower write queue 324(1) to the write queue 314(1) in the order in which they are received (i.e., FIFO). Once in the write queue 314(1) of the network namespace driver 162(1), the network namespace driver 162(1) may then transfer the replies to the client 110(1). The VLAN identifier on the reply packet is determined based on the egress interface and will match the VLAN identifier on the requesting packet.

Figure 4:
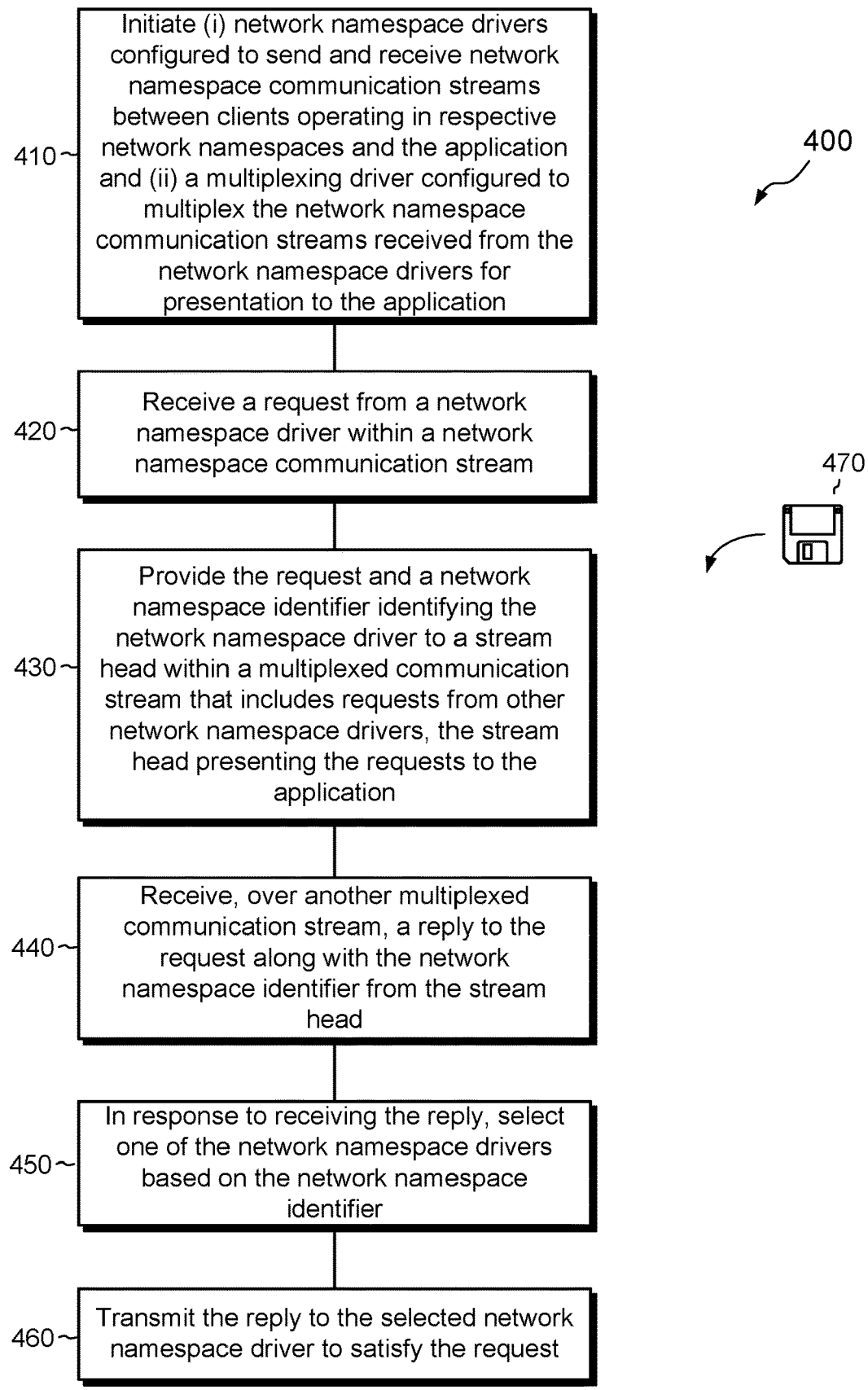
FIG. 4 is a flow chart illustrating a method of carrying out the improved technique in the electronic environment of FIG. 1.

FIG. 4 shows a method 400 of operating a server computer running an application for clients operating in multiple network namespaces. The method 400 may be performed by the software constructs described in connection with FIG. 1, which reside in the memory 140 of the server computer 120 and are run by the processing units 124.

At 410, the server computer instantiates (i) network namespace drivers configured to send and receive network namespace communication streams between clients operating in respective network namespaces and the application and (ii) a multiplexing driver configured to multiplex the network namespace communication streams received from the network namespace drivers for presentation to the application. This may be done in response to a reboot of the server computer 120 or upon adding a new network namespace.

At 420, the multiplexing driver receives a request from a network namespace driver within a network namespace communication stream.

At 430, the multiplexing driver provides the request and a network namespace identifier identifying the network namespace driver to a stream head within a multiplexed communication stream that includes requests from other network namespace drivers, the stream head presenting the requests to the application. The Steam head preserves the identification of each datagram (UDP) or request (TCP) from request to reply by associating the Network Namespace ID of each datagram (UDP) or request (TCP) with its reply packet.

At 440, the multiplexing driver receives a reply to the request along with the network namespace identifier from the stream head over another multiplexed communication stream.

At 450, the multiplexing driver selects one of the network namespace drivers based on the network namespace identifier in response to receiving the reply.

At 460, the multiplexing driver transmits the reply to the selected network namespace driver to satisfy the request.

Improved techniques of operating a server computer running an application for clients operating in multiple network namespaces involve multiplexing communications streams from clients hosted in different network namespaces into a single communication stream to present the requests to an application as if they originated from a single network namespace. Advantageously, the improved techniques arrange network communications in a multiple-network-namespace environment such that only one listener is needed even when running applications that do not recognize the multiple network namespaces.

Having described certain embodiments, numerous alternate embodiments or variations can be made. For example, while the examples above identified packets using VLAN identifiers, more generic network namespace handles may be considered. Such handles may contain a token or keyword identifying the network namespace in which the client generating the request operates. The token or keyword may be static or dynamic according to operating conditions in the server computer.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 470 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of operating a server computer running an application for client devices operating in multiple network namespaces, the method comprising:

instantiating, by processing circuitry of the server computer, (i) multiple network namespace drivers, each network namespace driver configured to send and receive network namespace communication streams between client devices operating in respective network namespaces and the application, and (ii) a multiplexing driver configured to multiplex the network namespace communication streams received from the network namespace drivers for presentation to the application, each network namespace being a construct that provides a logical copy of a network stack, with its own routes, firewall rules, and network devices;

receiving, by the multiplexing driver, a request within a network namespace communication stream from a network namespace driver;

providing, by the multiplexing driver, the request and a network namespace identifier identifying the network namespace driver to a stream head within a multiplexed communication stream that includes requests from other network namespace drivers, the stream head presenting the request to the application;

receiving, by the multiplexing driver, a reply to the request along with the network namespace identifier from the stream head;

in response to receiving the reply, selecting, by the multiplexing driver, one of the network namespace drivers based on the network namespace identifier; and transmitting, by the multiplexing driver, the reply to the selected network namespace driver.

2. A method as in claim 1, wherein each network namespace driver includes (i) a read queue that provides requests to a respective network namespace communication stream, the read queue receiving the requests from client devices operating in a respective network namespace in a first-in, first-out manner, and (ii) a write queue that receives replies to requests to the client devices operating in the respective network namespace in a first-in, first-out manner.

3. A method as in claim 2, wherein the multiplexing driver includes (i) multiple lower read queues and (ii) an upper read queue, each of the multiple lower read queues containing requests received from the read queues of the network namespace drivers, wherein the method further comprises, after receiving the request, arranging the request in a lower read queue that contains requests received from client devices operating in the same network namespace, and wherein providing the request and the network namespace identifier to the stream head includes combining the request as arranged in the lower read queue and other requests arranged in other lower read queues in the upper read queue.

4. A method as in claim 3, wherein the stream head includes a read queue from which requests from multiple network namespace drivers are presented to the application, and wherein providing the request and the network namespace identifier to the stream head further includes transferring the request and the network namespace identifier from the upper read queue of the multiplexing driver to the read queue of the stream head in a first-in, first-out manner with respect to the other requests combined with the request in the upper read queue.

5. A method as in claim 2, wherein the stream head includes a write queue to which replies from the application to requests presented to the application by the stream head are arranged in a first-in, first-out manner.

6. A method as in claim 5, wherein the multiplexing driver includes (i) multiple lower write queues and (ii) an upper write queue, each of the multiple lower write queues containing replies to requests received from the write queue of the stream head, wherein receiving the reply to the request along with the network namespace identifier from the stream head includes providing the reply and the identifier to the upper write queue of the multiplexing driver, and wherein selecting one of the network namespace drivers includes identifying a lower write queue in the upper write queue based on the network namespace identifier.

7. A method as in claim 1, wherein the server computer includes a namespace configuration repository that contains protocol-specific settings;

wherein instantiating the network namespace drivers includes providing the protocol-specific settings to the network namespace communication stream to effect communications between the application and client devices operating in the network namespace.

8. The method of claim 1, wherein the stream head acts as a single listener for communications from the network namespace drivers, presenting itself as a single network endpoint for a multiplexed stream of requests from multiple network namespaces.

9. The method of claim 1, further comprising running the application on the server computer.

10. The method of claim 1, wherein providing the network namespace identifier includes:

receiving a VLAN (Virtual Local Area Network) identifier from a switch that connects a particular client device to the server computer, the particular client device operating in a particular network namespace; and using the VLAN identifier as the network namespace identifier for identifying the particular network namespace.

11. The method of claim 10, wherein receiving the request from the network namespace driver occurs in response to the server receiving a client request from the particular client device over an interface dedicated to the VLAN and paired to the particular network namespace.

12. A computer program product including a non-transitory, computer-readable storage medium which stores executable code, which when executed by a computer, causes the computer to perform a method of operating a server computer running an application for client devices operating in multiple network namespaces, the method comprising:

instantiating (i) multiple network namespace drivers, each network namespace driver configured to send and receive network namespace communication streams between client devices operating in respective network namespaces and the application, and (ii) a multiplexing driver configured to multiplex the network namespace communication streams received from the network namespace drivers for presentation to the application, each network namespace being a construct that provides a logical copy of a network stack, with its own routes, firewall rules, and network devices;

receiving a request from a network namespace driver within a network namespace communication stream;

providing the request and a network namespace identifier identifying the network namespace driver to a stream head within a multiplexed communication stream that includes requests from other network namespace drivers, the stream head presenting the requests to the application;

receiving, over another multiplexed communication stream, a reply to the request along with the network namespace identifier from the stream head;

in response to receiving the reply, selecting one of the network namespace drivers based on the network namespace identifier; and transmitting the reply to the selected network namespace driver to satisfy the request.

13. A computer program product as in claim 12, wherein each network namespace driver includes (i) a read queue that provides requests to a respective network namespace communication stream, the read queue receiving the requests from client devices operating in a respective network namespace in a first-in, first-out manner, and (ii) a write queue that receives replies to requests to the client devices operating in the respective network namespace in a first-in, first-out manner.

14. A computer program product as in claim 13, wherein the multiplexing driver includes (i) multiple lower read queues and (ii) an upper read queue, each of the multiple lower read queues containing requests received from the read queues of the network namespace drivers, wherein the method further comprises, after receiving the request, arranging the request in a lower read queue that contains requests received from client devices operating in the same network namespace, and wherein providing the request and the network namespace identifier to the stream head includes combining the request as arranged in the lower read queue and other requests arranged in other lower read queues in the upper read queue.

15. A computer program product as in claim 14, wherein the stream head includes a read queue from which requests from multiple network namespace drivers are presented to the application, and wherein providing the request and the network namespace identifier to the stream head further includes transferring the request and the network namespace identifier from the upper read queue of the multiplexing driver to the read queue of the stream head in a first-in, first-out manner with respect to the other requests combined with the request in the upper read queue.

16. A computer program product as in claim 13, wherein the stream head includes a write queue to which replies from the application to requests presented to the application by the stream head are arranged in a first-in, first-out manner.

17. A computer program product as in claim 16, wherein the multiplexing driver includes (i) multiple lower write queues and (ii) an upper write queue, each of the multiple lower write queues containing replies to requests received from the write queue of the stream head, wherein receiving the reply to the request along with the network namespace identifier from the stream head over the other multiplexed communication stream includes providing the reply and the identifier to the upper write queue of the multiplexing driver, and wherein selecting one of the network namespace drivers includes identifying a lower write queue in the upper write queue based on the network namespace identifier.

18. A computer program product as in claim 12, wherein the server computer includes a namespace configuration repository that contains protocol-specific settings;

wherein instantiating the network namespace drivers includes providing the protocol-specific settings to the network namespace communication stream to effect communications between the application and client devices operating in the network namespace.

19. An electronic apparatus constructed and arranged to operate a server computer running an application for client devices operating in multiple network namespaces, the electronic apparatus including:

a network interface;

memory; and controlling circuitry couple to the memory, the controlling circuitry being constructed and arranged to:

instantiate (i) multiple network namespace drivers, each network namespace driver configured to send and receive network namespace communication streams between client devices operating in respective network namespaces and the application, and (ii) a multiplexing driver configured to multiplex the network namespace communication streams received from the network namespace drivers for presentation to the application, each network namespace being a construct that provides a logical copy of a network stack, with its own routes, firewall rules, and network devices;

receive a request from a network namespace driver within a network namespace communication stream;

provide the request and a network namespace identifier identifying the network namespace driver to a stream head within a multiplexed communication stream that includes requests from other network namespace drivers, the stream head presenting the requests to the application;

receive, over another multiplexed communication stream, a reply to the request along with the network namespace identifier from the stream head;

in response to receiving the reply, select one of the network namespace drivers based on the network namespace identifier; and transmit the reply to the selected network namespace driver to satisfy the request.

20. An electronic apparatus as in claim 19, wherein each network namespace driver includes (i) a read queue that provides requests to a respective network namespace communication stream, the read queue receiving the requests from client devices operating in a respective network namespace in a first-in, first-out manner, and (ii) a write queue that receives replies to requests to the client devices operating in the respective network namespace in a first-in, first-out manner.

21. An electronic apparatus as in claim 20, wherein the multiplexing driver includes (i) multiple lower read queues and (ii) an upper read queue, each of the multiple lower read queues containing requests received from the read queues of the network namespace drivers, wherein the controlling circuitry is further constructed and arranged to, after receiving the request, arrange the request in a lower read queue that contains requests received from client devices operating in the same network namespace, and wherein the controlling circuitry constructed and arranged to provide the request and the network namespace identifier to the stream head is further constructed and arranged to combine the request as arranged in the lower read queue and other requests arranged in other lower read queues in the upper read queue.

22. An electronic apparatus as in claim 21, wherein the stream head includes a read queue from which requests from multiple network namespace drivers are presented to the application, and wherein the controlling circuitry constructed and arranged to provide the request and the network namespace identifier to the stream head is further constructed and arranged to transfer the request and the network namespace identifier from the upper read queue of the multiplexing driver to the read queue of the stream head in a first-in, first-out manner with respect to the other requests combined with the request in the upper read queue.

23. An electronic apparatus as in claim 20, wherein the stream head includes a write queue to which replies from the application to requests presented to the application by the stream head are arranged in a first-in, first-out manner.

24. An electronic apparatus as in claim 23, wherein the multiplexing driver includes (i) multiple lower write queues and (ii) an upper write queue, each of the multiple lower write queues containing replies to requests received from the write queue of the stream head, wherein the controlling circuitry constructed and arranged to receive the reply to the request along with the network namespace identifier from the stream head over the other multiplexed communication stream is further constructed and arranged to provide the reply and the identifier to the upper write queue of the multiplexing driver, and wherein the controlling circuitry constructed and arranged to select one of the network namespace drivers is further constructed and arranged to identify a lower write queue in the upper write queue based on the network namespace identifier.

\* \* \* \* \*